US 6,701,084 B2

(12) United States Patent
Onda et al.

(10) Patent No.: US 6,701,084 B2
(45) Date of Patent: Mar. 2, 2004

(54) CAMERA

(75) Inventors: Kazuhiko Onda, Saitama (JP); Yasuhiko Tanaka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/971,637

(22) Filed: Oct. 9, 2001

(65) Prior Publication Data

US 2002/0041765 A1 Apr. 11, 2002

(30) Foreign Application Priority Data

Oct. 6, 2000 (JP) ........................................ 2000-307057

(51) Int. Cl.⁷ ............................................... G03B 17/02
(52) U.S. Cl. ........................................................ 396/538
(58) Field of Search ................................. 396/535, 538, 396/440

(56) References Cited

U.S. PATENT DOCUMENTS

| | | | | |
|---|---|---|---|---|
| 5,585,876 A | * | 12/1996 | Kobayashi | 396/440 |
| 5,745,813 A | * | 4/1998 | Kotani et al. | 396/440 |
| 5,752,110 A | * | 5/1998 | Iijima et al. | 396/538 |
| 5,758,211 A | * | 5/1998 | Miyamoto | 396/176 |
| 6,006,044 A | | 12/1999 | Okuno | 396/538 |
| 6,229,966 B1 | * | 5/2001 | Tsuji | 396/538 |
| 6,244,760 B1 | * | 6/2001 | Ue et al. | 396/440 |
| 6,247,854 B1 | * | 6/2001 | Terada | 396/440 |
| 6,330,396 B1 | * | 12/2001 | Boyd et al. | 396/6 |
| 6,404,993 B1 | * | 6/2002 | Zawodny et al. | 396/538 |

FOREIGN PATENT DOCUMENTS

JP          9-203943        8/1997

* cited by examiner

*Primary Examiner*—Christopher Mahoney
(74) *Attorney, Agent, or Firm*—Young & Thompson

(57) ABSTRACT

A camera includes a main body covered with a front cover and a rear cover. The main body has a film take-up chamber. The film take-up chamber has an opening in a right side. In order to cover the opening, a fixed lens barrel of a lens assembly is disposed. A part of the fixed lens barrel constructs a part of the film take-up chamber. To back and front wall portions of the film take-up chamber, back and front press springs are attached respectively.

16 Claims, 6 Drawing Sheets

CAMERA

BACKGROUND OF THE INVENTION

1. Field of the Invention

The present invention relates to a camera, and more particularly to a camera having a press spring for pressing a filmstrip on a take-up spool.

2. Description Related to the Prior Art

When a film cartridge of IX240 type is loaded in a camera, a drive shaft of the camera is engaged with a spool of the film cartridge and rotated to advance a filmstrip wound around the spool in the film cartridge. The filmstrip advanced from the film cartridge passes through a film passage way disposed between a rear cover and an exposure aperture on the filmstrip, and reaches the film take-up chamber.

Inside the film take-up chamber, a take-up spool is rotatably disposed for winding the filmstrip. Back and front press springs are provided in a back side of the camera and in a side of a taking lens respectively, and fixed on a inner face of a wall of the film take-up chamber by press fitting. Thus, the back and front press springs strongly press the filmstrip on the take-up spool so as to wind the filmstrip around the take-up spool.

For example, a camera which is disclosed in U.S. Pat. No. 6,006,044 (a U.S. Patent corresponding to Japanese Patent Laid-open Publication No. H9-222648) or Japanese Patent Laid-open Publication No. H9-203943 has a main body in which a film take-up chamber is formed. To the main body, a fixed lens barrel constructing a lens assembly is attached, and the fixed lens barrel is formed with a part of the wall of the film take-up chamber. As the press spring is attached to the wall, the fixed lens barrel is supplied for the main body after the press spring is previously attached to the fixed lens barrel, which simplifies to constitute the camera. Further, as the part of the wall of the film take-up chamber is formed with the fixed lens barrel, the camera has a smaller size than that in which the whole wall of the film take-up chamber is formed with the main body.

However, in the camera disclosed in the publication No. H9-222648 and the like, as the press spring is attached to the fixed lens barrel, a reactive force of the press spring is effective to the lens barrel. For low cost and decrease of weight of the camera, the fixed lens barrel is made of plastics whose thickness is not so much. Therefore, the reactive force sometimes causes to deform the fixed lens barrel. If the fixed lens barrel is deformed, the lens assembly does not smoothly shift for- and backward, and the lens assembly can't move along a designated optical axis of a taking lens.

SUMMARY OF THE INVENTION

An object of the present invention is to provide a camera in which a fixed lens barrel of a lens assembly is prevented from being deformed by a press spring.

A second object of the present invention is to provide a camera in which an imaginary central line of the lens assembly is always on and along a designated optical axis of a taking lens and a movable lens barrel smoothly slides.

In order to achieve the above objects, a camera of the present invention includes a lens assembly constructed of a movable lens barrel and a fixed lens barrel. The fixed lens barrel is fixed to a main body of the camera. In the main body, a film take-up chamber is integrally formed. A wall forming the film take-up chamber includes a front wall portion, a back wall portion. Between the front and back wall portions, a first opening is formed in a right side, and a second opening is formed in a left side. The fixed lens barrel is disposed such that a part thereof may cover the first opening, and partly construct the wall of the film take-up chamber. Further, the left wall portion is fixed to the main body with covering the second opening. First and second press springs are attached to the film take-up chamber for pressing a filmstrip onto a take-up spool which is rotatably disposed in the film take-up chamber.

The first and second press springs include clamp sections to nip the front wall portion and the back wall portion respectively. The front wall portion has at least one protrusion, and the clamp section has at least one hole to fit on the protrusion. The first and second press springs include rollers. The rollers are supported at respective free ends of the first and second press springs.

According to the invention, while the first press spring is attached to the film take-up chamber, the fixed lens barrel fixed to the main body is prevented from being deformed by a reactive force of the first press spring causes. Accordingly, the movable lens barrel can always slide smoothly, and the imaginary central line of the lens assembly is on and along the design optical axis of the lens.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
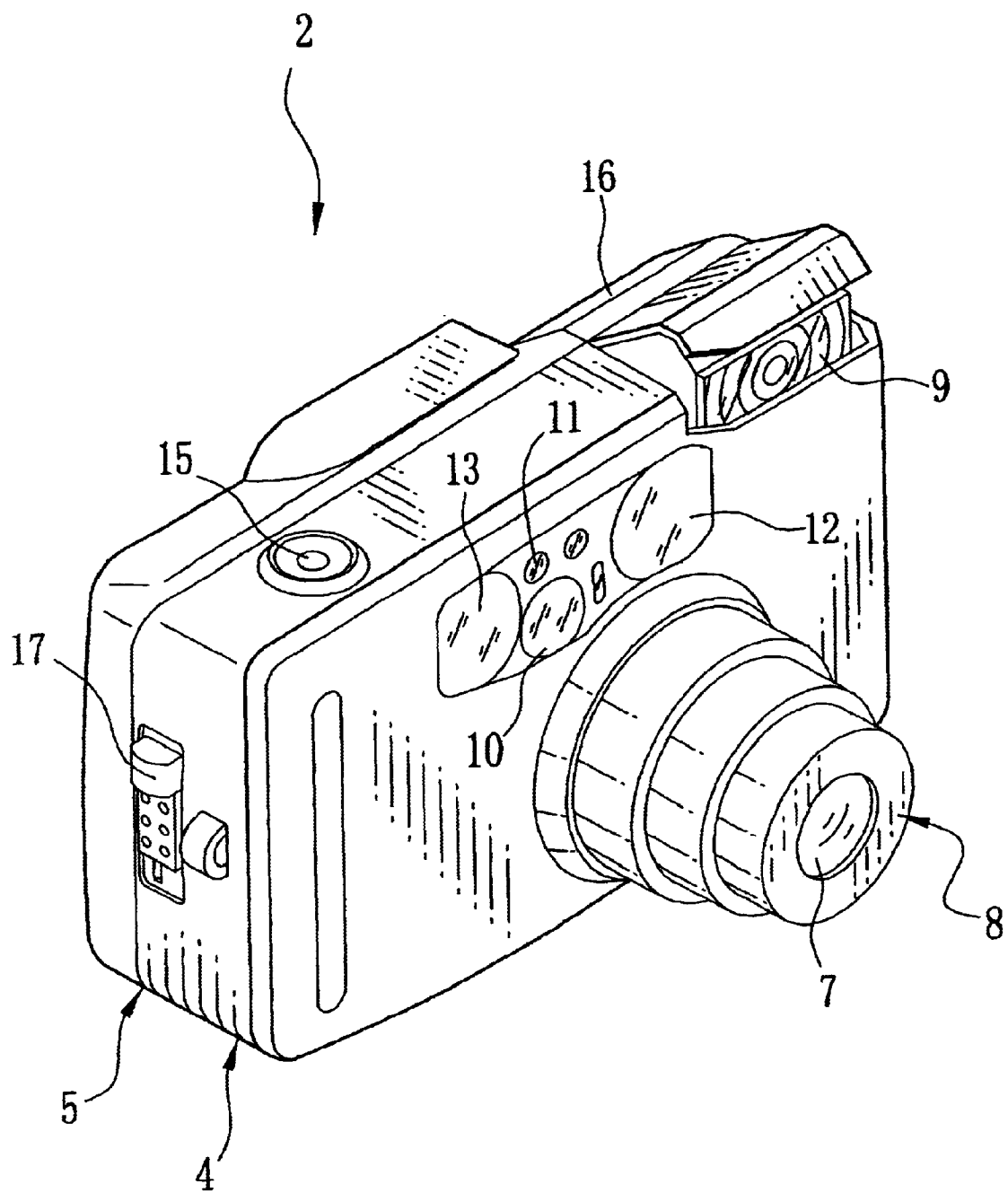
FIG. 1 is a perspective view of a camera of the present invention.

In FIG. 1, the camera 2 includes a front cover 4, a rear cover 5, a lens assembly 8, a flash emitting section 9, a finder objective window 10, a photometric window 11, a light-projecting window 12 and a light-receiving window 13. The lens assembly 8 holds the taking lens 7, and is disposed in the middles of a front face of the camera 2. The flash emitting section 9 is provided in a left side of the camera 2, in view of a photographer behind the camera 2, and the finder objective window is in the middle of an upside.

The camera 2 has a release button 15 on a top surface thereof. A rear surface of the camera, as well known, is provided with the finder objective window, a liquid crystal display panel, a zooming button and the like. Behind the flash emitting section 9, a battery room is formed for dry batteries which are used as a power source of the camera 2, and the battery room is covered with a battery room lid 16.

A side surface of the camera 2 is provided with an operation member 17 which are slidable up- and downward. The operation member 17 is used for opening a not shown lid of a cartridge room 19 in which a film cartridge 18 is loaded (see FIG. 2A). While a filmstrip 21 in the film cartridge 18 in the cartridge room 19 is not used up, the operation member is locked not to open.

Figure 2:
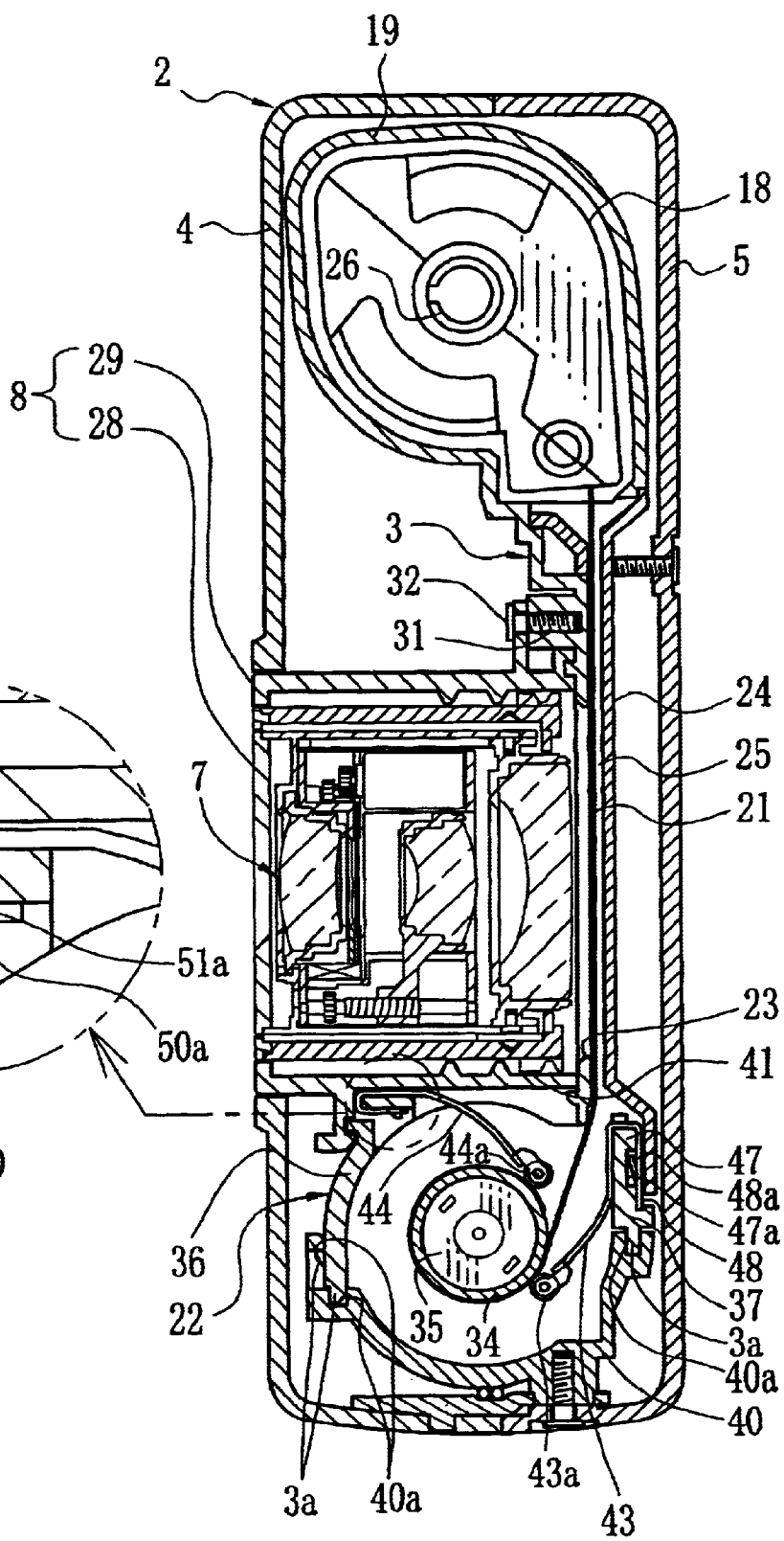
FIG. 2A is a sectional vies of the camera of the first embodiment.
FIG. 2B is an enlarged view illustrating a condition of attachment of a front press spring in FIG. 2A to an engage plate.

In FIGS. 2A and 2B, the camera 2 includes the main body 3 of a plastic molded article, to which the front cover 4 and the rear cover 5 are attached. In the main body 3, the cartridge room 19, the film take-up chamber 22, and an exposure aperture 23 are formed. In the film take-up chamber 22, the filmstrip 21 advanced from the film cartridge 18 is wound. The exposure aperture 23 is disposed between the film cartridge room 19 and the film take-up chamber 22 for determining an exposure area on the filmstrip 21. Behind the exposure aperture 23, a film regulation plate 24 is disposed in order to support the filmstrip 21 from a back side thereof. Thus, between the exposure aperture 23 and the film regulation plate 24, a film passage way 25 is formed.

In the upside of the cartridge room 19, there are a drive shaft and a light-shielding lid open/close mechanism that are not shown. The drive shaft is engaged with a spool 26 of the film cartridge 18 and rotated. The light-shielding lid open/close mechanism causes to rotate a light-shielding lid to open and close a film port of the film cartridge 18.

In front of the exposure aperture 23, the lens assembly 8 is fixed to the lens body 3. The lens assembly 8 is a zooming lens assembly, and constructed of a movable lens barrel 28 and a fixed lens barrel 29. The movable lens barrel 28 holds the taking lens 7. A not shown zooming motor drives the movable lens barrel 28 to protrude out of or retract in the fixed lens barrel 29. The rear face of the camera 2 is provided with a switch for a power source. When the switch is turned ON, the movable lens barrel 28 protrudes from the camera 2, and when the switch is turned OFF, the movable lens barrel 28 is retracted in the camera 2. A position of the movable lens barrel 28 is adjusted by operating the operation member 17 and a focal length of the taking lens 7 is changed.

In the film take-up chamber 22, a take-up spool 34 is rotatably disposed. The take-up spool 34 has a pillar shape and a space therein. In the space, an motor 35 is provided so as to drive the advancing of the filmstrip 21. A surface of the take-up spool 34 is covered with a rubber tube (not shown) for preventing slip of the filmstrip 21.

The film take-up chamber 22 has a wall that is constructed of a front wall portion 36, a back wall portion 37, top and bottom wall portions 38, 39 (See, FIG. 4), a left wall portion 40, a right wall portion 41. The front wall portion 36, the back wall portion 37, the top wall portion 38 and the bottom wall portion 39 are formed with the main body 3. Between the front wall portion 36 and a back wall portion 37, there are left and right openings to which the left wall portion 40 and the right wall portion 41 are disposed respectively. The left wall portion 40 and the right wall portion 41 are another member of the main body 3. The left wall portion 40 has engage grooves 40a. The engage grooves 40a are engaged with engage portions 3a formed on the main body 3 such that the left wall portion 40 may be fixed to the main body 3. A part of the fixed lens barrel is used as the right wall portion 41.

Figure 3:
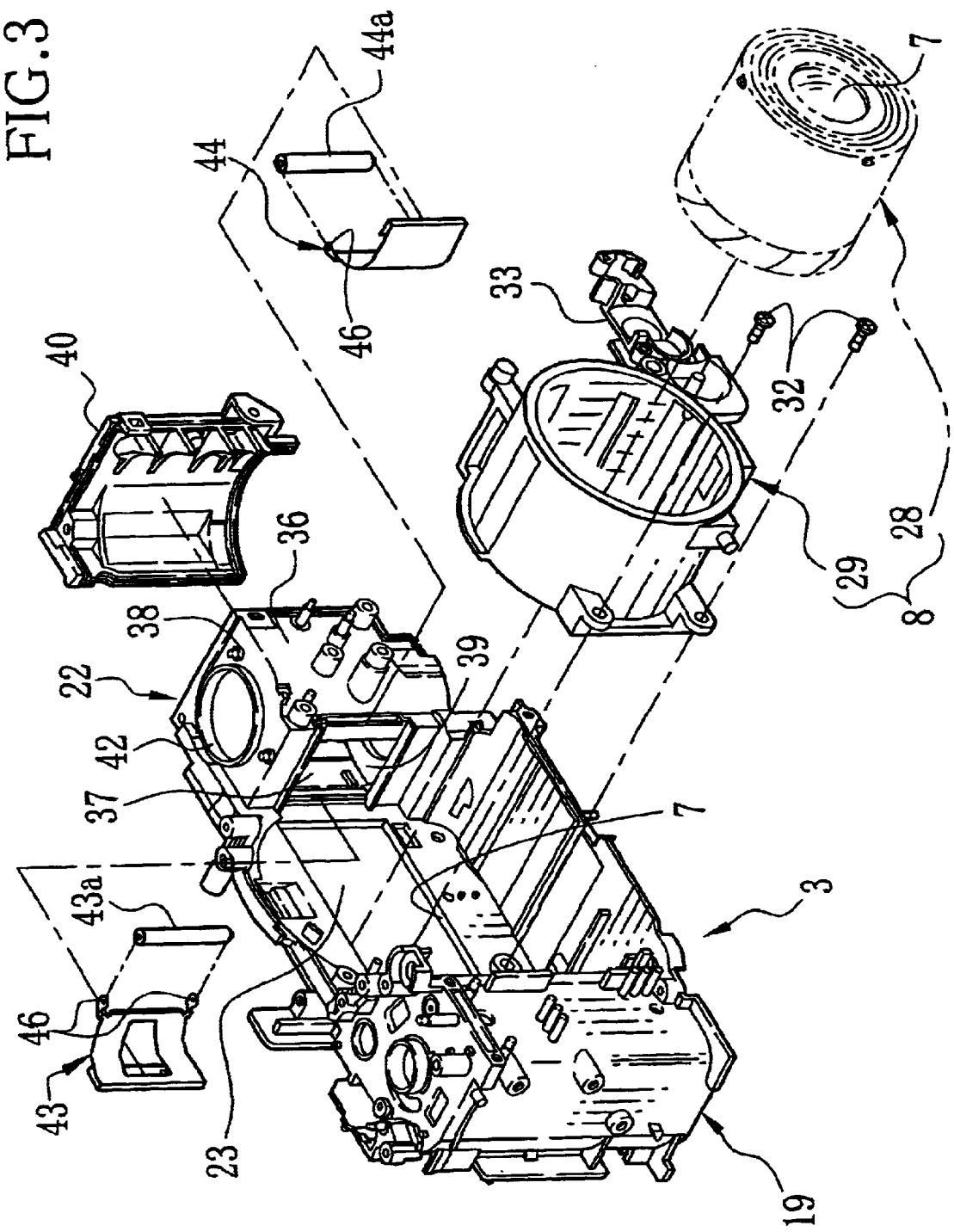
FIG. 3 is an exploded view illustrating a main body and a lens assembly.

In FIG. 3, respective screw holes 31 are formed on the fixed lens barrel 29 to fit on the screws 32. The fixed lens barrel 29 is fixed to the main body 3 by screws 32 such that the right opening may be covered with the right wall portion 40. Further, the fixed lens barrel 29 is provided with a gear holder plate 33 for holding gears of a gear train through which the zooming motor drives to move the lens assembly 8.

In the top wall portion 38 and the bottom wall portion 39, shaft holes 42 are formed to rotatably secure the take-up spool 34. As the shaft holes 42 secure the take-up spool 34 and the fixed lens barrel 29 is fixed to the main body 3 by the screws, the film take-up chamber is closed in a light-tight fashion.

A back press spring 43 and a front press spring 44 are attached to the front wall portion 36 and the back wall portion 37. In FIG. 2A, free ends of the back and front press springs 43, 44 are provided with respective rollers 43a and 44a. The roller 43a is biased by the back press spring 43 to press the filmstrip 21 on the take-up spool 34, which has been advanced through the film passage way 25. The roller 44a is biased by the front press spring 44 to press the filmstrip 21 on the take-up spool 34. The filmstrip 21 in the film take-up chamber 34 is guided to the roller 43a by the back press spring 43, and an edge of the filmstrip 21 is pressed onto the take-up spool 34 by the roller 43a. A frictional force between the rubber tube and the filmstrip 21 causes the edge of the filmstrip 21 to guide to the front press spring 44 smoothly, in accordance with rotation of the take-up spool 34. After pressed on the take-up spool 34 by the roller 44a, the filmstrip 21 is guided to the roller 43a by the back press spring 43. Then, the edge of the filmstrip 21 is located under a part of the filmstrip 21 which is pressed by the roller 43a of the back press spring 43.

Figure 4:
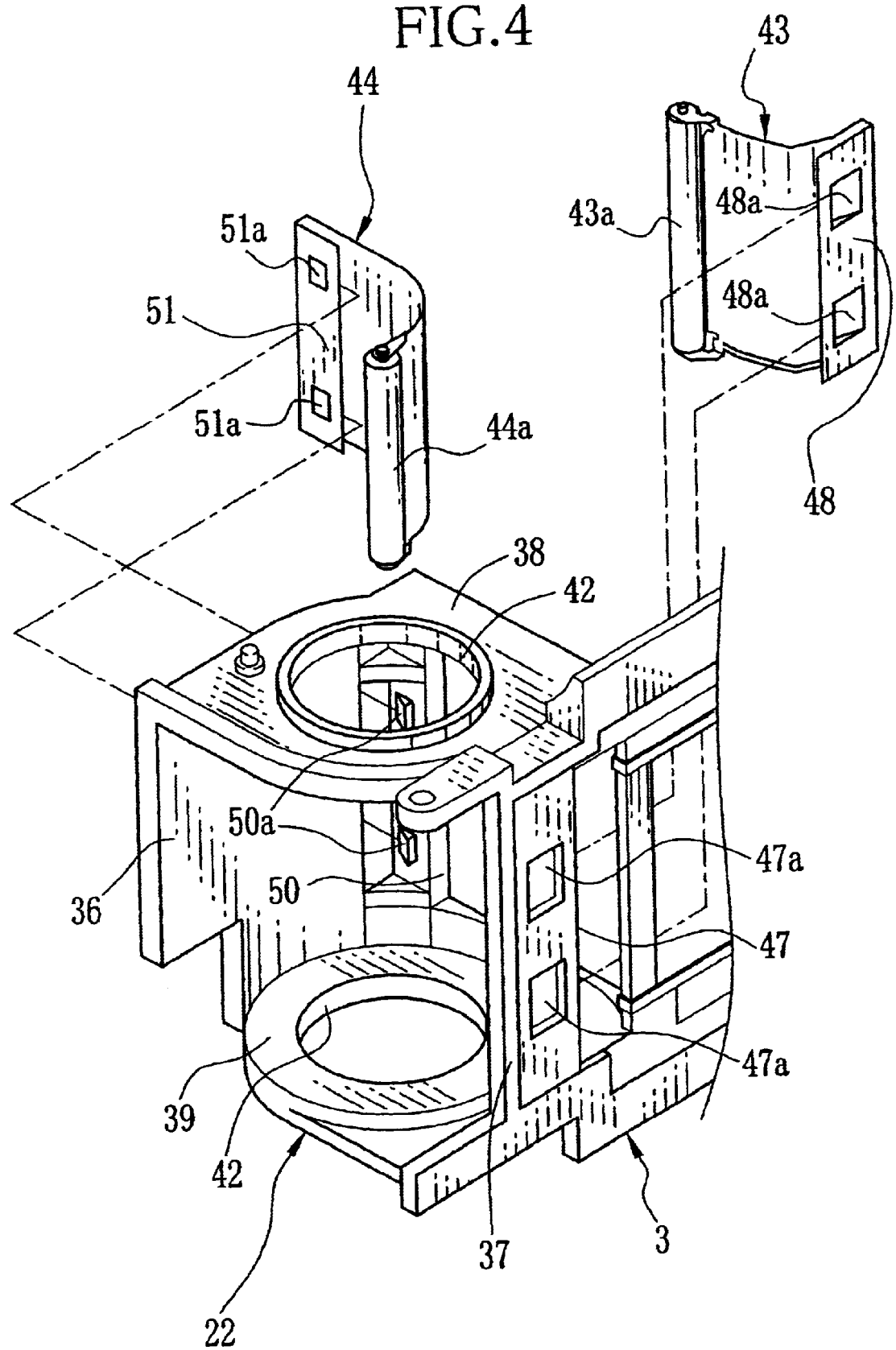
FIG. 4 is a perspective view from a rear side of the film take-up chamber.

In FIG. 4, the back and front press springs 43, 44 are formed by bending metal plates to curve between their opposite free and fixed ends respectively. The back press spring 43 has a roller hole 46 for holding the roller 43 at the free end and a clamp section 48 at the fixed end. The clamp section 48 has a channel-shaped form to nip a protrusion 47 of the back wall portion 37. Behind the protrusion 47, recesses 47a are formed. Protruding portions 48a is fitted in the recesses 47a. Note holes can be formed instead of the recesses 47a The front press spring 44 has the roller hole 46 for holding the roller 44a at the free end and a clamp section 51 at the fixed end. The clamp section 51 has a channel-shaped form to nip an engage plate 50 which is formed at an edge of the front wall portion 36 by providing a slit in the edge, and which is disposed close to the right wall portion. On an inner face of the engage plate 50, claws 50a are formed, and engage with holes 51a formed in the clamp section 51.

Further, as the left opening is formed and covered with the left wall portion 40, a mold removal is carried out so easily. The engage plate 50 and the claws 50a are easily fanned.

The effects of the structure described above will be explained. When the spool 26 is rotated, the filmstrip 21 is advanced from the film cartridge 18 through the film passage way 25 into the film take-up chamber 22. In the film take-up chamber 22, the roller 43a is biased by the back press spring 43 to press the filmstrip 21 on the take-up spool 34. There is a frictional force between the filmstrip 21 and the rubber tube covering on the take-up spool 34. Accordingly, when the take-up spool 34 rotates, the end of the filmstrip 21 is smoothly guided onto the inner face of the film take-up chamber 22 and then to the front press spring 44. The filmstrip 21 is pressed on the take-up spool 34 by the roller 44a.

Further, when the take-up spool 34 is rotated, the edge of the filmstrip 21 is located under a part of the filmstrip 21 which is pressed by the back press spring 43. The filmstrip 21 is sequentially rolled around the take-up spool 34 during rotation of the take-up spool 34.

After a predetermined amount of the filmstrip 21 is advanced, the take-up spool 34 stops rotating, and a picture can be photographed. The back and front press springs 43, 44 bias to press the filmstrip 21 on the take-up spool 34. The bias of the back and front press spring 43, 44 does not cause to deform the fixed lens barrel 29. Because while the part of the fixed lens barrel 29 is the right wall portion 41, the back and front press springs are attached to the front wall portion 36 and the back wall portion 37.

The photographer presses the zooming button to adjust the focal length of the taking lens 7. As the bias of the back and front press springs 43, 44 does not deform the fixed lens barrel 29, the movable lens barrel 28 always slides smoothly and an imaginary central line of the lens assembly 8 is always positioned on the designated optical axis of the taking lens 7.

Figures 5A, 5B:
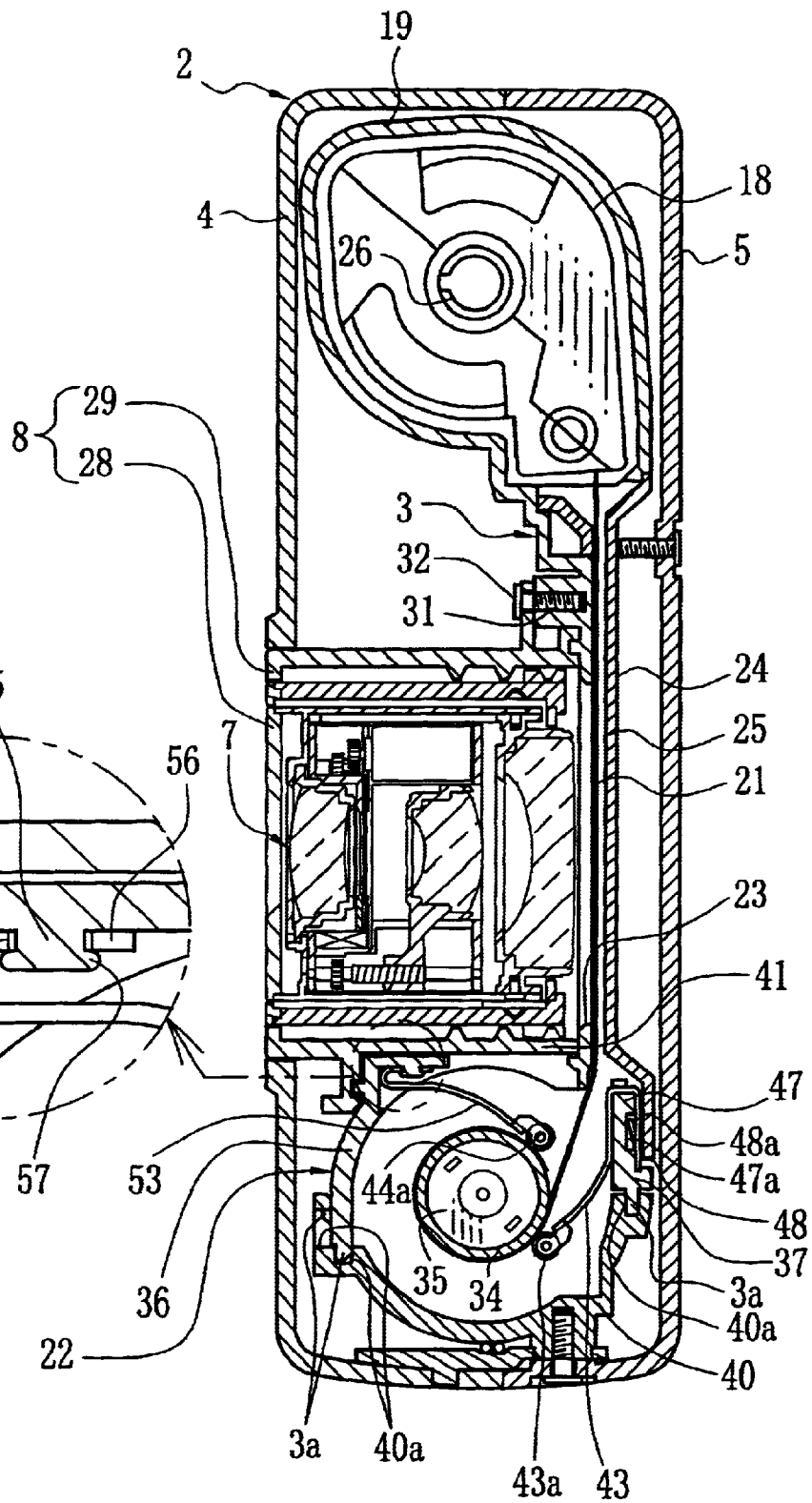
FIG. 5A is a sectional view of the camera illustrating the second embodiment of the present invention.
FIG. 5B is an enlarged view illustrating a condition of attachment of a front press spring in FIG. 5A to an engage plate.

In the above embodiment, the clamp section 51 of the front press spring 44 nips the engage plate 50 of the front wall portion 36 to fix the front press spring 44. The present invention is not limited to the embodiment. In the second embodiment, as shown in FIGS. 5A and 5B, the holes 51a are formed at the fixed end of the front press spring 53, and the front wall portion 36 has claws 55. The claws 55 are made to fit on the holes 54, and fixers 57 secure the front press spring 53 to the front side section of the front wall portion 36.

Figure 6:
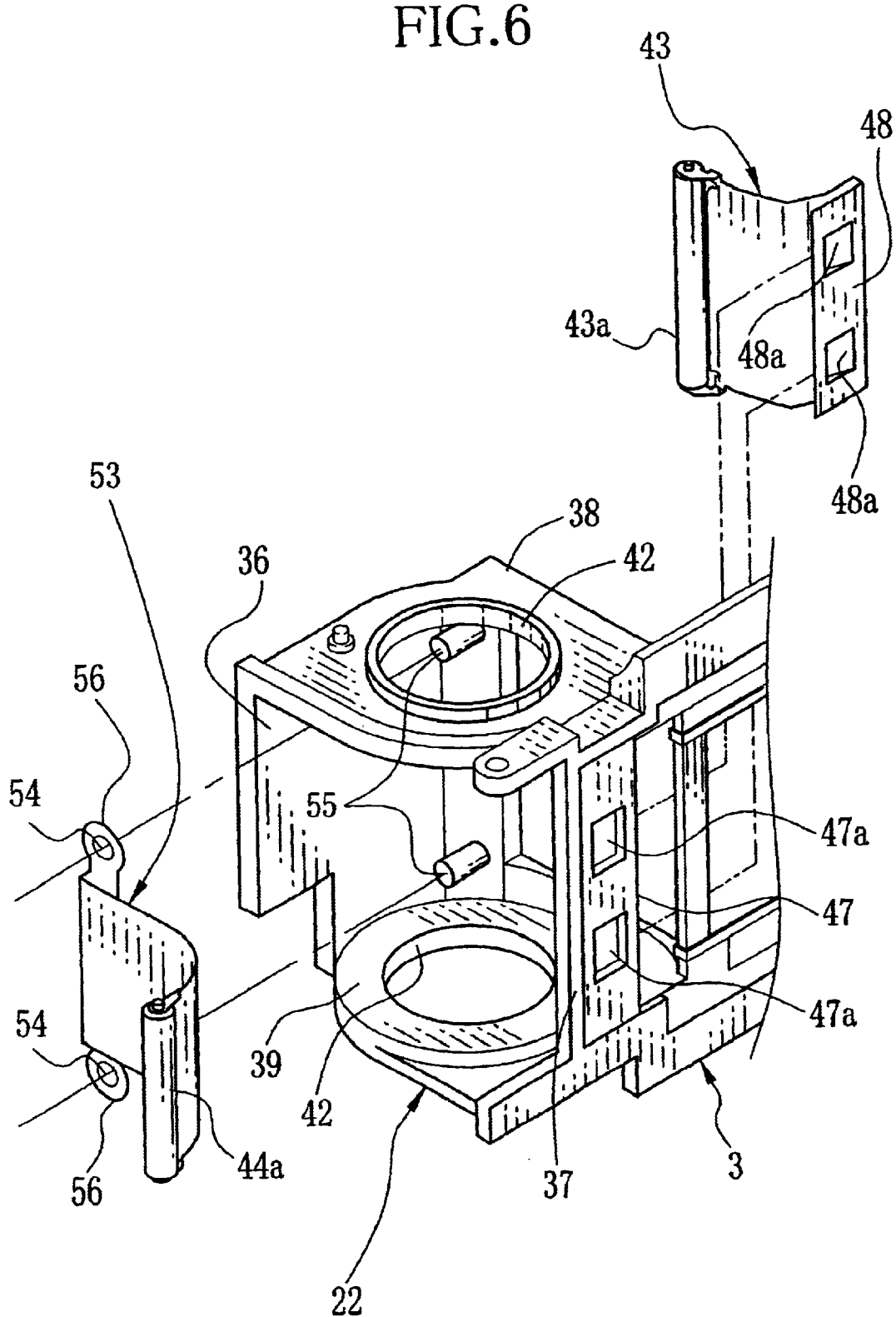
FIG. 6 is a perspective view from the rare side of the film take-up chamber in the second embodiment.

As shown in FIG. 6, the claws 55 are disposed on the front side section of the front wall portion 36 and protruded into the inside of the film take-up chamber 22. While holes 54 fit to the claws 55, the claws 55 are caulked with a heated jig and the like to form the fixers 57. The fixers 57 secure the front press spring 53. Further, the front press spring may be also secured by screwing or press fitting.

In the above embodiment, the press springs are provided with the rollers. However, the press spring may have no rollers.

Furthermore, the present invention is applied to a single lens reflex camera, a lens-fitted photo film unit and the like.

Various changes and modifications are possible in the present invention and may be understood to be within the present invention.

What is claimed is:

1. A camera having a main body and a lens assembly, a film take-up chamber being formed in said main body, a take-up shaft being rotatably disposed in said film take-up chamber for winding a filmstrip, said lens assembly having at least one movable lens barrel and a fixed lens barrel fixed to said main body, said camera comprising:
   a wall forming said film take-up chamber, said wall being integrated with said main body;
   a first opening formed in said wall, said fixed lens barrel being disposed so as to cover said first opening; and
   a first press spring fixed to said wall, said first spring pressing said filmstrip on said take-up shaft;
   wherein the fixed lens barrel is free of any spring attached thereto that presses the filmstrip on the take-up shaft.

2. The camera of claim 1, wherein said wall includes a front wall portion and a back wall portion, said first opening and a second opening are formed between said front wall portion and said back wall portion, said first opening is located in a right side of said film take-up chamber, and said second opening is located in a left side of said film take-up chamber.

3. A camera described in claim 2, wherein said main body is a plastic molded article, and said second opening is useful for mold removal.

4. A camera described in claim 3, and further comprising a left wall portion, said left wall portion being fixed to said main body so as to cover said second opening.

5. A camera described in claim 4, and further comprising a second press spring, said second press spring being fixed to said back wall portion.

6. A camera described in claim 5, wherein said first press spring and said second press spring include respective clamp sections having a channel-shaped form, and said clamp sections nip said front wall portion and said back wall portion.

7. A camera described in claim 6, wherein said first press spring and said second press spring include respective rollers, and said rollers are supported at respective free ends of said first and second press springs.

8. A camera described in claim 6, wherein said front wall portion has at least one first protrusion, said clamp section has at least a hole, and said hole fits on said first protrusion.

9. A camera described in claim 8, wherein said first protrusion protrudes to said second opening for easy mold removal by molding said main body.

10. A camera having a main body and a lens assembly, a film take-up chamber being formed in said main body, a take-up shaft being rotatably disposed in said film take-up chamber for winding a filmstrip, said lens assembly having at least one movable lens barrel and a fixed lens barrel fixed to said main body, said camera comprising:
    a wall forming said film take-up chamber, said wall being integrated with said main body;
    a first opening formed in said wall, said fixed lens barrel being disposed so as to cover said first opening, said fixed lens barrel serving as a part of said wall; and
    a first press spring fixed to said wall, said first spring pressing said filmstrip on said take-up shaft;
    wherein said wall includes a front wall portion and a back wall portion, said first opening and a second opening are formed between said front wall portion and said back wall portion, said first opening is located in a right side of said film take-up chamber, and said second opening is located in a left side of said film take-up chamber;
    said camera further comprising a second press spring, said second press spring being fixed to said back wall portion; and
    wherein said first press spring and said second press spring include respective clamp sections having a channel-shaped form, and said clamp sections nip said front wall portion and said back wall portion.

11. A camera described in claim 10, wherein said first press spring and said second press spring include respective rollers, and said rollers are supported at respective free ends of paid first and second press springs.

12. A camera described in claim 10, wherein said front wall portion has at least one first protrusion, said clamp section has at least a hole, and said hole fits on said first protrusion.

13. A camera described in claim 12, wherein said first protrusion protrudes to said second opening for easy mold removal by molding said main body.

14. A camera described in claim 13, wherein said back wall has at least one recess or hole, said second press spring has at least one protruding portion, and said protruding portion fits on said recess or hole.

15. A camera described in claim 14, wherein said lens assembly is a zooming lens assembly, and said movable lens barrel moves between a retracted position in said fixed lens barrel and a protruding position out of said fixed lens barrel.

16. A camera described in claim 12, wherein said first protrusion is caulked such that said protrusion may not be put out of said hole.

* * * * *